US008463539B2

(12) United States Patent
Muramatsu et al.

(10) Patent No.: US 8,463,539 B2
(45) Date of Patent: Jun. 11, 2013

(54) INFORMATION PROCESSING APPARATUS FOR MOVABLE BODY AND VEHICLE NAVIGATION APPARATUS

(75) Inventors: Satoru Muramatsu, Kariya (JP); Taichi Satoh, Kariya (JP); Kazutomo Tsuchikawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 1117 days.

(21) Appl. No.: 12/155,662

(22) Filed: Jun. 6, 2008

(65) Prior Publication Data

US 2008/0306679 A1 Dec. 11, 2008

(30) Foreign Application Priority Data

Jun. 7, 2007 (JP) ................................ 2007-151768

(51) Int. Cl.
*G01C 21/00* (2006.01)

(52) U.S. Cl.
USPC .......................................... 701/400; 701/117

(58) Field of Classification Search
USPC ........................................ 701/117, 200, 400
See application file for complete search history.

(56) References Cited

U.S. PATENT DOCUMENTS

| | | | | |
|---|---|---|---|---|
| 5,289,184 | A | 2/1994 | Suzuki | |
| 6,353,792 | B1 * | 3/2002 | Murthy | 701/117 |
| 6,477,353 | B1 | 11/2002 | Honda et al. | |
| 6,748,316 | B2 * | 6/2004 | Takayama et al. | 701/200 |
| 2002/0040270 | A1 * | 4/2002 | Kwak et al. | 701/200 |
| 2004/0073599 | A1 | 4/2004 | Arakawa | |
| 2005/0038596 | A1 * | 2/2005 | Yang et al. | 701/200 |
| 2009/0043499 | A1 | 2/2009 | Endo et al. | |

FOREIGN PATENT DOCUMENTS

| | | |
|---|---|---|
| JP | A-06-111180 | 4/1994 |
| JP | A-06-334549 | 12/1994 |
| JP | A-07-098795 | 4/1995 |
| JP | A-08-095488 | 4/1996 |
| JP | A-2001-195332 | 7/2001 |
| JP | A-2003-097956 | 4/2003 |
| JP | A-2005-345293 | 12/2005 |

OTHER PUBLICATIONS

Office Action dated Apr. 9, 2009 from Japan Patent Office in corresponding to JP patent application No. 2007-151768 (and English Translation).

* cited by examiner

*Primary Examiner* — Dilek B Cobanoglu
(74) *Attorney, Agent, or Firm* — Posz Law Group, PLC

(57) ABSTRACT

A navigation apparatus acquires, through an antenna and a receiver, external information such as traffic information or the like, and a control unit in the navigation apparatus acquires validity time information from the external information. If the validity time information includes a standard time that represents a current time, the standard time together with a relative time or period information in the validity time information is used for determining whether a valid period has passed. If the validity time information does not include the standard time representing the current time, the lapse of the valid period is determined based on the standard time generated by a standard time generator and one of the relative time and the period information in the validity time information. Then, the external information is invalidated by deleting the information from an information storage if it is determined that the valid period has passed.

17 Claims, 3 Drawing Sheets

INFORMATION PROCESSING APPARATUS FOR MOVABLE BODY AND VEHICLE NAVIGATION APPARATUS

CROSS REFERENCE TO RELATED APPLICATION

The present application is based on and claims the benefit of priority of Japanese Patent Application NO. 2007-151768 filed on Jun. 7, 2007, the disclosure of which is incorporated herein by reference.

FIELD OF THE INVENTION

The present invention generally relates to a method of information processing that processes external information for use in a vehicle.

BACKGROUND INFORMATION

Conventionally, a navigation apparatus or the like in a vehicle uses external information such as congestion information acquired from information infrastructure by a receiver apparatus, and the receiver apparatus that feeds the navigation apparatus with the external information for display deletes the external information acquired from outside of the vehicle if the navigation apparatus has been turned on for a certain period that is greater than a preset time period from a reception time of the external information from outside of the vehicle by the receiver apparatus. For example, the disclosure in Japanese patent document JP-3186330 describes an information deletion scheme described above.

However, the receiver apparatus keeps using the external information until the preset time period lapses. That is, in other words, even if new external information is available during the preset time period, the new external information will not be used by the receiver apparatus and the navigation apparatus.

Further, even if a validity time of the external information is longer than the preset time period, the external information is deleted when the preset time period has elapsed from a turn-on time of the navigation apparatus.

SUMMARY OF THE INVENTION

In view of the above and other problems, the present invention provides an information processing apparatus that utilizes external information in an effective manner for use in a navigation apparatus or the like.

The information processing apparatus for a movable body includes: an external information acquisition unit capable of acquiring and storing at least external information including validity time information for defining a valid period of the external information; a validity time acquisition unit capable of acquiring the validity time information from the external information acquired by the external information acquisition unit; and an information invalidation unit capable of invalidating the external information stored in the external information acquisition unit if it is determined that the valid period of the external information has expired by examining the valid period of the external information in the validity time information.

Because the external information in the above apparatus is invalidated based on the validity time (e.g., expiration date or the like), the use of the external information after the validity time of the information and/or the invalidation of the external information prior to the expiration of the validity time is prevented.

The "external information" is, in this case, information transmitted from a traffic information center or the like on an outside of the apparatus to represent traffic congestion, traffic accident, local weather and the like that affects the travel of the movable body.

BRIEF DESCRIPTION OF THE DRAWINGS

Other objects, features and advantages of the present invention will become more apparent from the following detailed description made with reference to the accompanying drawings, in which.

DETAILED DESCRIPTION

Figure 1:
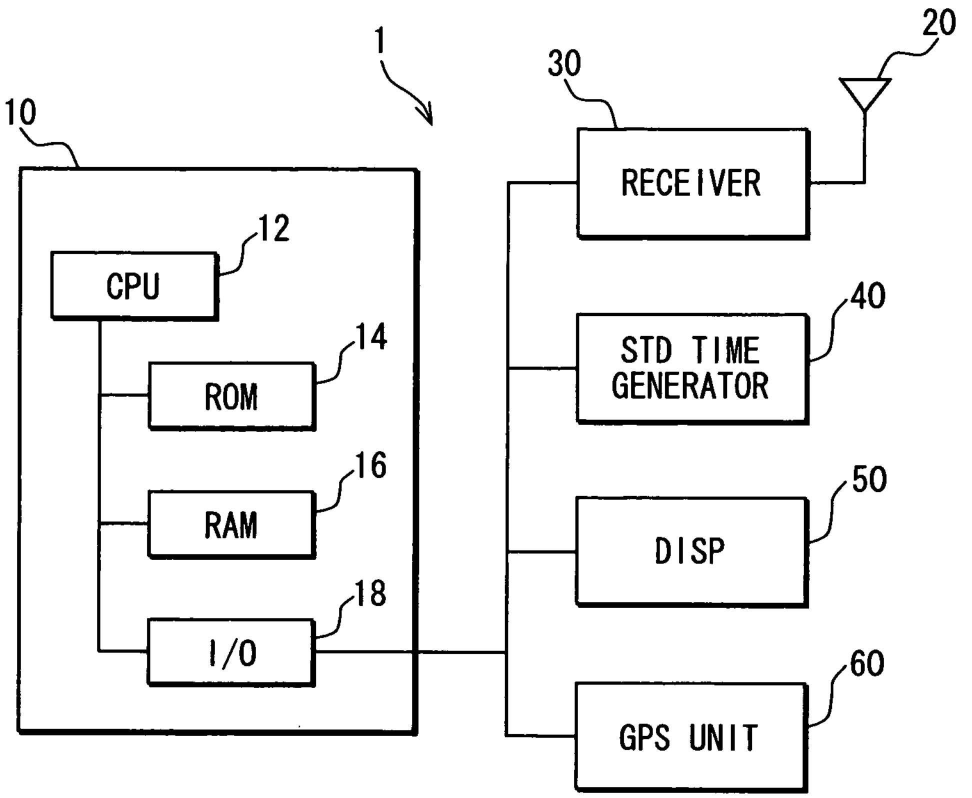
FIG. 1 shows a block diagram of a navigation apparatus in an embodiment of the present disclosure.

The embodiments of the present invention are explained with reference to the drawing in the following. In addition, the present invention needs not be limited to the form disclosed in the following embodiments, but includes various forms as long as they pertain to the scope of the present invention.

(First Embodiment)

FIG. 1 is a block diagram showing the configuration of a vehicle navigation apparatus 1. The vehicle navigation apparatus 1 includes a control unit 10, an antenna 20, a receiving unit 30, a standard time generator 40, a display unit 50 and a GPS unit 60 as shown in FIG. 1, and the vehicle navigation apparatus 1 is installed on a vehicle which is not illustrated.

The control unit 10 having a CPU12, ROM14, RAM16, I/O18 and the like performs the following processes. That is, processes are performed for:

(a) Acquiring external information including at least validity time information to show valid time of information (e.g., expiration time of the information), and memorizing it in the RAM16;

(b) Acquiring the validity time information from the acquired external information;

(c) Determining whether the valid time of the external information has passed based on a standard time and relative time when the relative time and the standard time that represents a current time are included in the validity time information as expiration time in the external information;

(d) Determining whether the valid time of the external information has passed based on the standard time that is generated by the generator 40 and relative time when the standard time that represents the current time is not included in the validity time information as expiration time in the external information;

(e) Determining whether the valid time of the external information has passed based on the standard time being within a valid period of period information when the period information and the standard time that represents the current time are included in the validity time information as expiration time in the external information;

(f) Determining whether the valid time of the external information has passed if the standard time generated by the generator 40 is within the valid period of the period information when the standard time that represents the current time is not included in the validity time;

(g) Invalidating the external information by erasing memorized external information in the RAM 16; and (h) Displaying a current vehicle position acquired from the GPS unit 60 on the display 50 after performing a route guidance process.

The antenna 20 is installed in a body portion of the vehicle which is not illustrated as a rod antenna or installed in a rear wind of the vehicle as a loop antenna to receive information that is transmitted by a vehicle information center or the like.

The receiving unit 30 demodulates external information received with the antenna 20, and outputs the information to the control unit 10 as digital data. The standard time generator 40 is a timer unit or a clock to generate the standard time that represents a current time, and the generator 40 operates on a power supply from a battery of the vehicle or the like, which is not illustrated, for outputting the current time to the control unit 10 as digital data.

The display unit 50 displays the external information received with the receiving unit 30 and a map together with a route guidance on the map based on the outputs from the GPS unit 60 and the control unit 10. More practically, the display unit 50 includes an LCD or a CRT, and is installed on a front panel of the vehicle.

The GPS unit 60 utilizes an electric wave from three or four GPS satellites in the sky for determining a current position of the vehicle, that is, a latitude, longitude, altitude (when the altitude is calculated, the electric wave from four GPS satellites is utilized.) of the vehicle, and outputs the calculated position to the control unit 10.

(Processing in the Control Unit 10)

Figure 2:
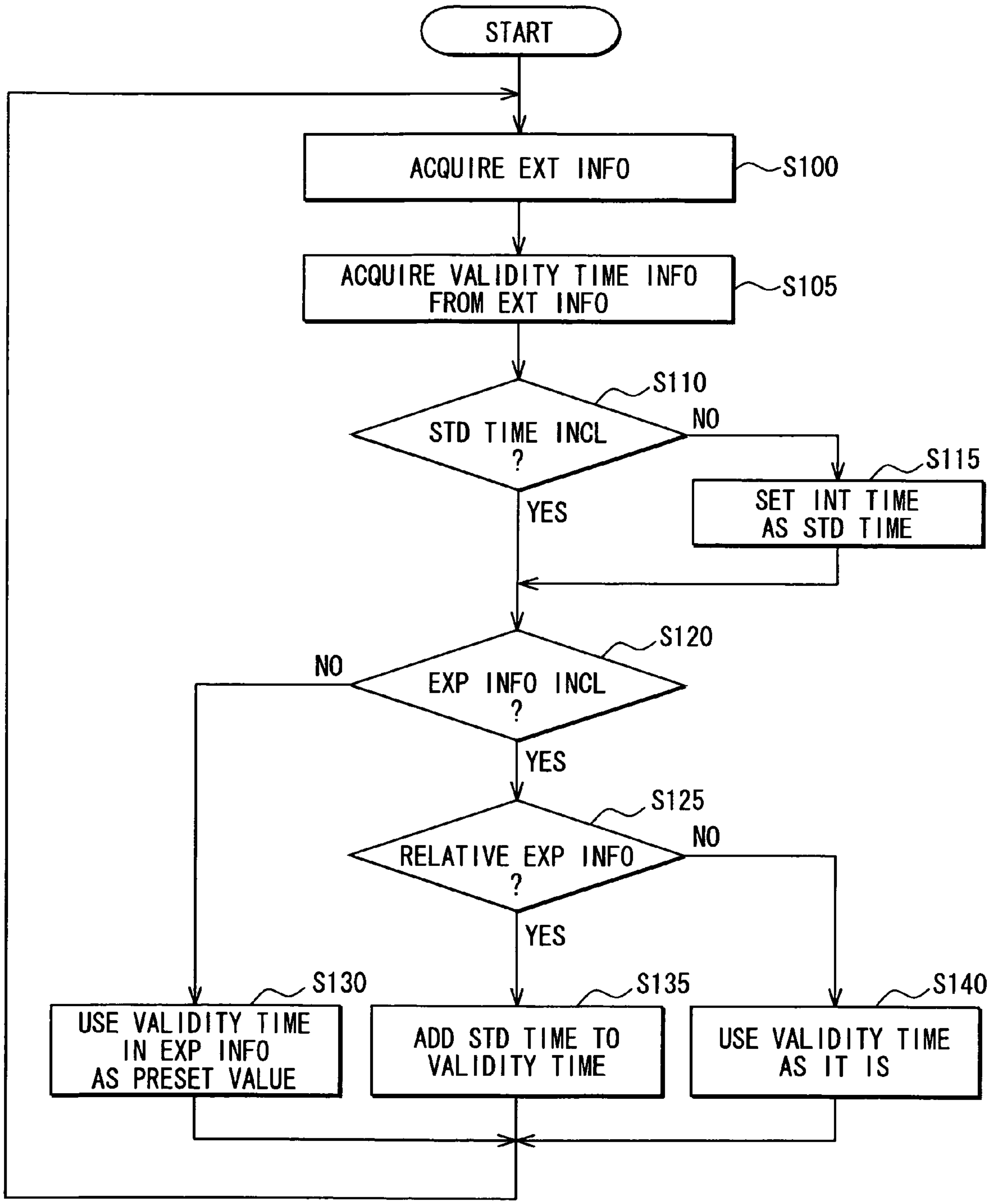
FIG. 2 shows a flowchart of a validity time processing process in the navigation apparatus.
Figure 3:
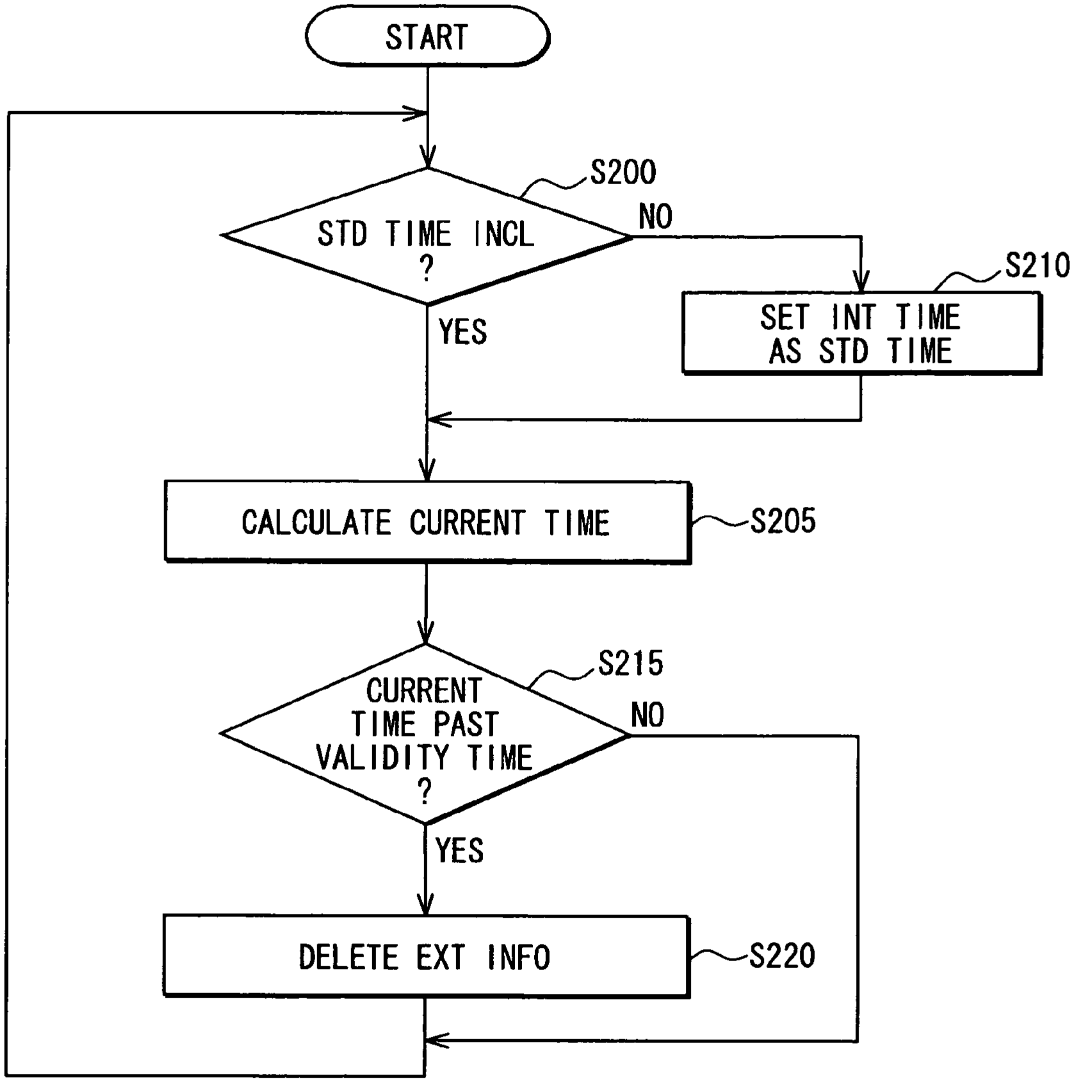
FIG. 3 shows a flowchart of an external information invalidation process in the navigation apparatus.

Based on FIG. 2 and FIG. 3, the contents of the processing in the control unit 10 are explained in the following. FIG. 2 is a flowchart showing a validity time processing, and FIG. 3 is a flowchart showing an external information invalidation processing.

(Validity Time Processing)

Processing of the validity time (e.g., expiration date, expiration time or the like) is started with a turn-on of a power supply for the vehicle navigation apparatus 1, and at first in S100, the external information is acquired from the receiving unit 30, and the information is memorized in RAM16. Then, in S105, validity time information is acquired from the external information acquired in S100 and memorized in RAM16.

Then, in S110, it is determined whether the standard time is included in the validity time information acquired in S105. If the standard time is included (S110:YES), the process is shifted to S120. If the standard time is not included (S110: NO), the process is shifted to S115.

In S115, the standard time is defined by using the time (i.e., an internal time) generated by the standard time generator 40.

In S120, it is determined whether period information (i.e., information on expiration time or the like) is included in the validity time information acquired in S105. Then, the process proceeds to step S125 if the period information is included (S120:YES). The process proceeds to S130 if the period information is not included (S120:NO).

In S125, it is determined whether the validity time information is relative information, and the process is shifted to S135 if the validity time information is relative information (S125:YES). The process is shifted to S140 if the validity time information is not relative information (S125:NO).

In S130, a valid period of time in the validity time information is set to a predetermined value, and the validity time information is represented by using an icon on the display unit 50. In other words, there is no validity time information in the case of S130, with only event type information (for example, information of road closure at a certain point due to an accident) is provided. Therefore, in such a case, a predetermined value (e.g., 30 minutes) of information is added to the standard time, and the standard time modified by the predetermined value is displayed on the display unit 50 as the validity time information.

More practically, the valid period of the external information acquired in S100 is set to "12:30" by adding 30 minutes to the standard time when the standard time acquired in S105 or the standard time set in S115 is "12:00."

In addition, the predetermined value may be a fixed value, or the predetermined value may be changed according to the type of the external information acquired in S100. When the predetermined value is changed according to the type of the external information, an event code that represents the type of the external information included in the external information is acquired. Then, a table of predetermined values for each of the event codes stored in the ROM14 is referred to for selecting the predetermined value.

In S135, the validity time is set as the standard time with the valid period added thereto, and the validity time is represented by a validity time icon of the external information on the display unit 50. That is, for example, "12:05" is displayed on the display unit 50 as the validity time of the external information when the validity time information of the external information is acquired at "12:00" as the relative information of "being effective for five minutes."

In S140, the period information is used as the valid period as it is because the validity time information represents an absolute time, and the valid period is represented as an icon on the display unit 50 for displaying the valid period of the external information.

The process returns to S100 after displaying the validity time information on the display unit 50 set in S130-S140, and the validity time processing is repeated.

(External Information Invalidation Processing)

FIG. 3 is a flowchart showing an external information invalidation process. The external information invalidation process is started by a turn-on of a power supply for the vehicle navigation apparatus 1, and the external information invalidation process is carried out in parallel with the validity time processing.

In the external information invalidation process, it is determined whether there is the standard time information in the external information in S200 as shown in FIG. 3. In other words, it is determined whether the validity time information acquired in S100 and S105 of the validity time processing to be memorized in the RAM16 includes the standard time.

When it is determined that there is no standard time (S200: NO), the process is shifted to S210, and the time generated by the generator 40 (i.e., the internal time) is set as the standard time. When it is determined that there is the standard time in the external information (S200:YES), the process is shifted to S210.

In S210, the current time is calculated from the standard time acquired in S105 (cf. FIG. 2) or the standard time set in S205. Then, in S215, it is determined whether the current time calculated in S210 is past the validity time that is set in one of S130-S140 (cf. FIG. 2) of the validity time processing.

For example, if the calculated current time is "12:45" and the validity time in the external information is "12:30," it is determined that the current time is past the validity time. If the current time is past the validity time (S215:YES), the external information is deleted from the RAM 16 in S220, and the process returns to S200, for repeating the external information invalidation process.

On the other hand, if the current time is not past the validity time (S215:NO), the process returns to S200, and the external information invalidation processing is repeated.

(Advantageous Effect of the Process in Vehicle Navigation Apparatus 1)

The vehicle navigation apparatus 1 acquires, through the antenna 20 and the receiving unit 30, the external information and the validity time information is acquired from external information memorized in RAM16. Then, the validity time (e.g., an expiration time) of the external information in the validity time information is examined for determining if the valid period has past. If it is determined that the valid period has past, the external information in the RAM 16 is deleted.

In other words, the external information having the expiration time/date is prevented from being used after the expiration time/date, or the deletion of the external information prior to the expiration time/date is prevented because the external information in the RAM 16 is deleted based on the expiration time/date or the like in the external information.

In addition, the validity time information in the external information is determined based on the standard time and the relative time if the validity time information included in the external information is relative time and the standard time representing the current time is included therein. Therefore, the validity time, that is, the expiration time/date or the like, is accurately determined based on the standard time provided from outside of the apparatus 1 and the relative time.

That is, for example, even if the current time is determined based on the standard time provided from outside of the navigation apparatus 1 in a multi-standard time country such as U.S.A. or the like where the available standard time may change as the vehicle travels, the expiration time/date of the external information at the current time (i.e., at the time of processing) is accurately determined based on the standard time from outside of the navigation apparatus 1.

On the other hand, when the standard time representing the current time is not included in the external information, the standard time generator 40 is used to generate the standard time, and the expiration time/date is determined based on the standard time from the generator 40 and the relative time in the external information.

In the above-described manner, the validity time can be determined even when the standard time is not provided from outside.

In addition, when validity time information included in the external information includes information at least on a valid period as the validity time, and the standard time representing the current time is included in the validity time information, whether the valid period of the external information has passed is determined based on the fact the standard time is within the time that is defined by the period information. Therefore, it is possible for the apparatus 1 to correctly determine whether the valid period of the external information has passed based on the standard time provided from outside at the current time (i.e., at the time of processing).

Further, when the standard time representing the current time is not included in the external information, whether the expiration time/date of the external information is past is determined based on the period information in the external information and the standard time generated by the standard time generator 40. Therefore, the validity time can be determined by the relative time included in the external information even if the standard time is not provided.

(Other Embodiments)

Though the embodiment of the present invention has been fully explained, various modifications may also be included as other embodiments of the present invention as long as the modifications pertain to the scope of the invention.

(1)

Though the external information is stored in the RAM16 in the above embodiment, the external information may be stored in other storage such as auxiliary memory devices of a hard disk drive (HDD), a memory stick or the like.

(2)

Thought the external information is invalidated by deleting the information from the RAM 16 in the above embodiment, the external information may be invalidated by not using without deleting the external information from the RAM 16 or the like.

Non-use of the external information without deleting the information from the RAM 16 or the like may be implemented by using a flag that indicates that the acquired external information is within the valid period, by setting a non-use area in a memory of the RAM 16 or the like and moving the expired information to the non-use area after expiration, or by using similar schemes.

Such changes and modifications are to be understood as being within the scope of the present invention as defined by the appended claims.

What is claimed is:

1. An information processing apparatus for a movable body comprising:

an external information storage unit configured to acquire and store at least external information including validity time information for defining a valid period of the external information;

a valid period acquisition unit configured to acquire a valid period of the external information acquired by the external information storage unit;

an external information invalidation unit configured to invalidate the external information stored in the external information storage unit, when it is determined that the valid period of the external information has expired by examining the valid period of the external information; and a current time acquisition unit configured to acquire a current time, wherein when the valid period acquired by the valid period acquisition unit includes a standard time and a relative time relative to the standard time, the external information invalidation unit determines whether the valid period of the external information has expired based on the relative time and the standard time, when the valid period includes the relative time and does not include the standard time, the external information invalidation unit determines whether the valid period of the external information has expired based on the relative time and the current time acquired by the current acquisition unit, and when the valid period of the external information is determined as expired, the external information invalidation unit invalidates the external information by avoiding use of the external information stored in the external information storage unit and by moving the external information to a non-use area that stores the external information as non-use information.

2. The information processing apparatus of claim 1, wherein the external information storage unit acquires traffic information as the external information.

3. The information processing apparatus of claim 2, wherein the external information storage unit acquires weather information as the external information.

4. The information processing apparatus of claim 2, wherein the information processing apparatus is incorporated in a vehicle navigation apparatus.

5. The information processing apparatus of claim 1, wherein the external information storage unit acquires weather information as the external information.

6. The information processing apparatus of claim 5, wherein the information processing apparatus is incorporated in a vehicle navigation apparatus.

7. The information processing apparatus of claim 1, wherein the information processing apparatus is a vehicle navigation apparatus configured to be installed in a vehicle.

8. The information processing apparatus of claim 1 further comprising a standard time generation unit capable of generating a standard time for representing the current time, wherein when the validity time information does not include the standard time, the information invalidation unit determines whether the valid period of the external information has expired based on the relative time and the standard time that is generated by the standard time generation unit.

9. The information processing apparatus of claim 1, wherein the information invalidation unit invalidates the external information by deleting the external information stored in the external information storage unit.

10. The information processing apparatus of claim 1, wherein the information invalidation unit invalidates the external information by avoiding use of the external information stored in the external information storage unit.

11. The information processing apparatus of claim 1, wherein the validity time information specifies an expiration date when the external information is considered to be no longer valid.

12. An information processing apparatus for a movable body comprising:

an external information storage unit configured to acquire and store at least external information including validity time information for defining a valid period of the external information;

a valid period acquisition unit configured to acquire a valid period of the external information acquired by the external information storage unit;

an external information invalidation unit configured to invalidate the external information stored in the external information storage unit, when it is determined that the valid period of the external information has expired by examining the valid period of the external information; and a current time acquisition unit configured to acquire a current time, wherein when the valid period acquired by the valid period acquisition unit includes a standard time and a relative time relative to the standard time, the external information invalidation unit determines whether the valid period of the external information has expired or not by examining whether the standard time is within the valid period of the period information, and the external information invalidation unit determines the expiration of the external information that is already stored by the external information storage unit, when the valid period includes the relative time and does not include the standard time, the external information invalidation unit determines whether the valid period of the external information has expired based on the relative time and the current time acquired by the current acquisition unit, and when the valid period of the external information is determined as expired, the external information invalidation unit invalidates the external information by avoiding use of the external information stored in the external information storage unit and by moving the external information to a non-use area that stores the external information as non-use information.

13. The information processing apparatus of claim 12, wherein the external information storage unit acquires traffic information as the external information.

14. The information processing apparatus of claim 12, wherein the external information storage unit acquires weather information as the external information.

15. The information processing apparatus of claim 12, wherein the information processing apparatus is a vehicle navigation apparatus configured to be installed in a vehicle.

16. The information processing apparatus of claim 12 further comprising a standard time generation unit capable of generating a standard time for representing the current time, wherein when the validity time information does not include the standard time, the information invalidation unit determines whether the valid period of the external information has expired by examining whether the standard time that is generated by the standard time generation unit is within the valid period of the period information.

17. The information processing apparatus of claim 12, wherein the validity time information specifies an expiration date when the external information is considered to be no longer valid.

* * * * *